United States Patent [19]
Bloom et al.

[11] Patent Number: 5,710,652
[45] Date of Patent: Jan. 20, 1998

[54] LASER COMMUNICATION TRANSCEIVER AND SYSTEM

[75] Inventors: Scott H. Bloom; Eric Korevaar; Victor Chan; Irene Chen, all of San Diego; Michael D. Rivers, Santee; Amy Low, San Diego, all of Calif.

[73] Assignee: Trex Communications, San Diego, Calif.

[21] Appl. No.: 199,115

[22] Filed: Feb. 22, 1994

Related U.S. Application Data

[63] Continuation-in-part of Ser. No. 935,899, Aug. 27, 1992.

[51] Int. Cl.$^6$ .................................................. H04B 10/00
[52] U.S. Cl. ................................. 359/152; 359/172
[58] Field of Search .................................. 359/152, 172

[56] References Cited

U.S. PATENT DOCUMENTS

| | | | |
|---|---|---|---|
| 4,829,597 | 5/1989 | Gelbwachs | 455/617 |
| 5,119,225 | 6/1992 | Grant et al. | 359/172 |
| 5,282,073 | 1/1994 | Defour et al. | 359/159 |
| 5,390,040 | 2/1995 | Mayeux | 359/152 |
| 5,448,391 | 9/1995 | Iriyama et al. | 359/159 |
| 5,465,170 | 11/1995 | Arimoto | 359/159 |
| 5,526,161 | 6/1996 | Suzuki et al. | 359/172 |

*Primary Examiner*—Mark Hellner
*Attorney, Agent, or Firm*—Fish & Richardson P.C.

[57] ABSTRACT

A laser communication transceiver for transmitting information via laser beams to and from other similar laser communication transceivers. Each transceiver comprises a wavelength locked beacon laser providing a beacon beam. The transceivers determine the precise location of other transceivers by detecting these beacon beams with beacon receive units comprising atomic line filters matched to the beacon wavelength. Signals are transmitted by imposing an electronic signal on laser beams produced by one or more signal laser devices. These signals are directed with precision at other transceivers, and the signal beams are detected with very narrow field of view signal receive units. In a preferred embodiment, these transceivers are installed on 66 satellites in low earth orbit and on selected mountain tops on earth to provide a global communication system.

9 Claims, 9 Drawing Sheets

LASER COMMUNICATION TRANSCEIVER AND SYSTEM

This application is a continuation-in-part application of Ser. No. 07/935,899, entitled "Voigt Filter" filed Aug. 27, 1992 pending.

This invention relates to communication systems and in particular to laser communication transceivers.

BACKGROUND OF THE INVENTION

Free space laser communication originated in the mid-1960's shortly after the generation of light by the first lasers. The first successful laser communication up-link to space was achieved during a series of experiments conducted by NASA in the late 1960's using a ground based argon laser transmitting to a photo multiplier optical receiver feeding data to an rf down link. Information was sent by Morse code at about one-half bit per second. A limiting factor on free space laser communication is the presence of background light, mostly reflected sunlight. Efforts have been made to develop very narrow-band filters matched to the operating wavelengths of available light weight dependable lasers. Some of these efforts are disclosed in "Selected Papers on Free-Space Laser Communication", SPIE Milestone Series, Vol. MS30. But to date no system has been developed which would provide efficient, cost effective, space based laser communication.

What is needed is a laser communication transceiver device which could form the basis of a free space laser communication system.

SUMMARY OF THE INVENTION

The present invention provides laser communication transceivers for transmitting information via laser beams to and from other similar laser communication transceivers. Each transceiver comprises at least one wavelength locked beacon laser providing a beacon laser beam which is directed toward a distant transceiver. The distant transceiver determines the precise location of the beaconing transceiver by detecting this beacon beam with a beacon receive unit comprising a telescope and an atomic line filter matched to the beacon wavelength. Signals are transmitted by imposing an electronic signal on signal laser beams produced by one or more signal laser devices. These signal laser beams are directed with precision at the receiving transceivers, and the signal beams are detected with very narrow field of view signal receive units. A preferred transceiver according to the present invention uses the same telescope for receiving the beacon beam and the signal beam. It weighs less than 50 pounds, uses less than 75 Watts of electrical power and can transmit up to 1.13 GBPS at distances up to 5,000 km. Pound for pound and dollar for dollar this invention could be the best communication system ever developed for long distance point to point communication.

Two transceivers operate as a communications system with two separate subsystems: (1) a beacon-acquisition subsystem and (2) a signal transmitting-receiver subsystem. Rapid acquisition requires wide field of view in the acquisition unit. This wide field of view in the presence of reflected solar background is made possible with the atomic line filter in the acquisition unit matched to the laser wavelength of the beacon unit. Transmission at rapid data rates is made possible by accurate pointing of the signal beam by the transmitting unit, by accurate pointing of the telescope and by limiting the field of view of the signal receive unit.

In a preferred embodiment, four of these transceivers are installed on each of 66 satellites in low earth orbit and on selected mountain tops on earth to provide a global communication system. Information is transmitted from the information origin by fiber-optics to a mountain top transceiver. The optical information is converted to an electronic signal which serves as the input signal for the mountain top transceiver which transmits the information by laser beam to the nearest LEO satellite. The electronic output of the receiving transceiver on that satellite serves as the input signal to another transceiver on that satellite which transmits the information contained in the signal to another satellite. This process continues until the information is received by a transceiver on a satellite near a mountain top transceiver near the information destination. The information is then beamed down to the mountain top transceiver and then transmitted by fiber-optics to the information destination.

DETAILED DESCRIPTION OF PREFERRED EMBODIMENTS

A preferred embodiment of the present invention can be described by reference to the figures.

FREE SPACE LASER COMMUNICATION SYSTEM

Figure 1:
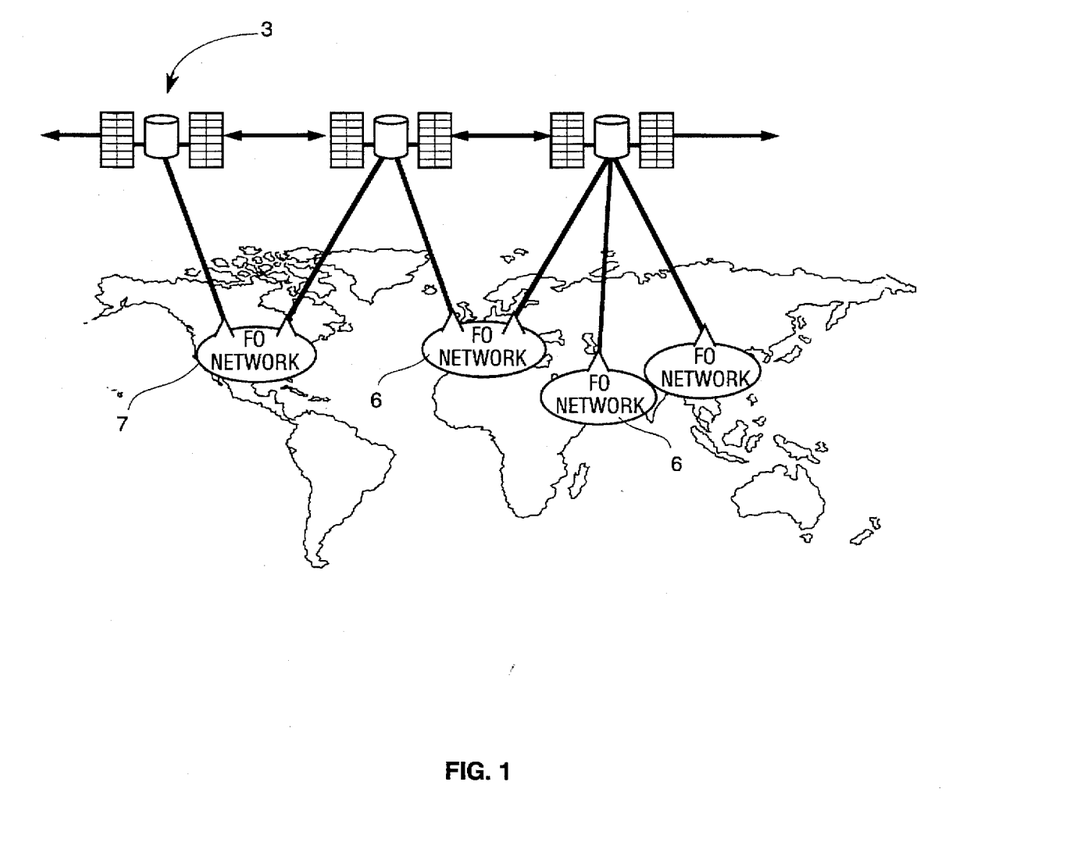
FIG. 1 shows a free space global communication system pursuant to the present invention.
Figure 2:
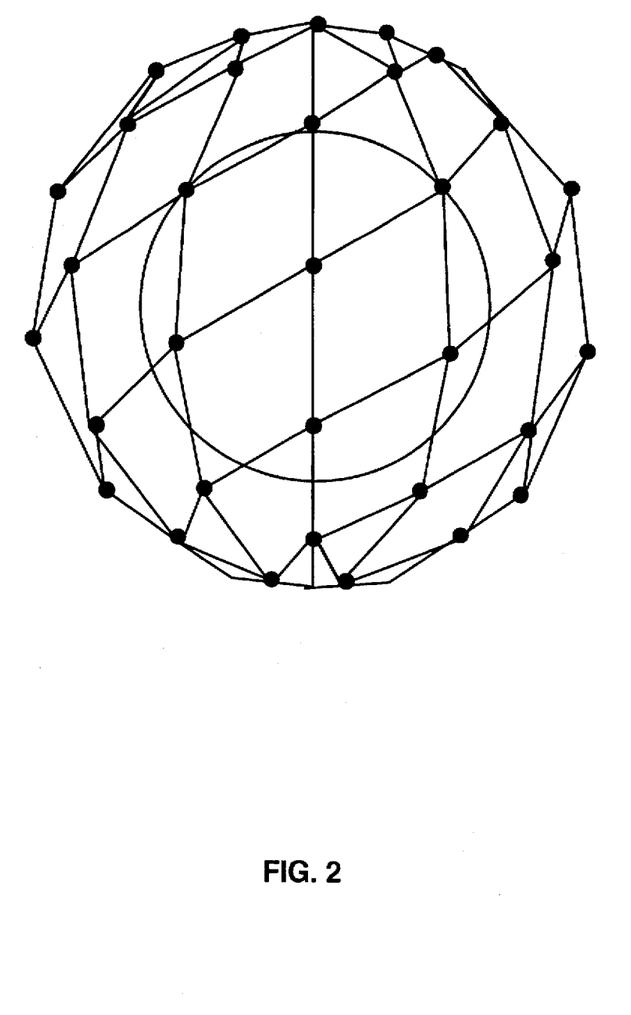
FIG. 2 is a drawing of a 66 satellite orbit scheme.

FIG. 1 shows in broad outline form the principal elements of a global free space laser communication system according to a preferred embodiment of the present invention. These elements include a large number of laser transceivers in low earth orbit. This preferred embodiment has 66 satellites 3 circling the earth at a height of 425 km as shown in FIG. 2. They are orbiting in 6 polar orbit paths with 11 satellites in each path about 3,900 km apart. Each satellite has mounted on it 4 transceivers to enable simultaneous communication with two or three other satellites and one or two ground stations. The transceiver units communicate to other transceivers in orbit and to ground based transceiver units. The communication system provided by this embodiment allows communication from any place on earth to any other place on earth. Earth based transceivers which are a part of this preferred system are preferably located on mountain tops. These mountain top transceivers are preferably tied into fiber-optic networks 6 which traverse the contiguous states of the United States and most other industrialized nations. The earth to satellite legs could be by radio or microwave if an appropriate mountaintop facility is not available.

The transceivers could also be mounted on aircraft for air to air communication or air to space or air to ground. They can also be used for ground to ground communication over relatively shorter straight-line distances.

THE TRANSCEIVER

Figure 3:
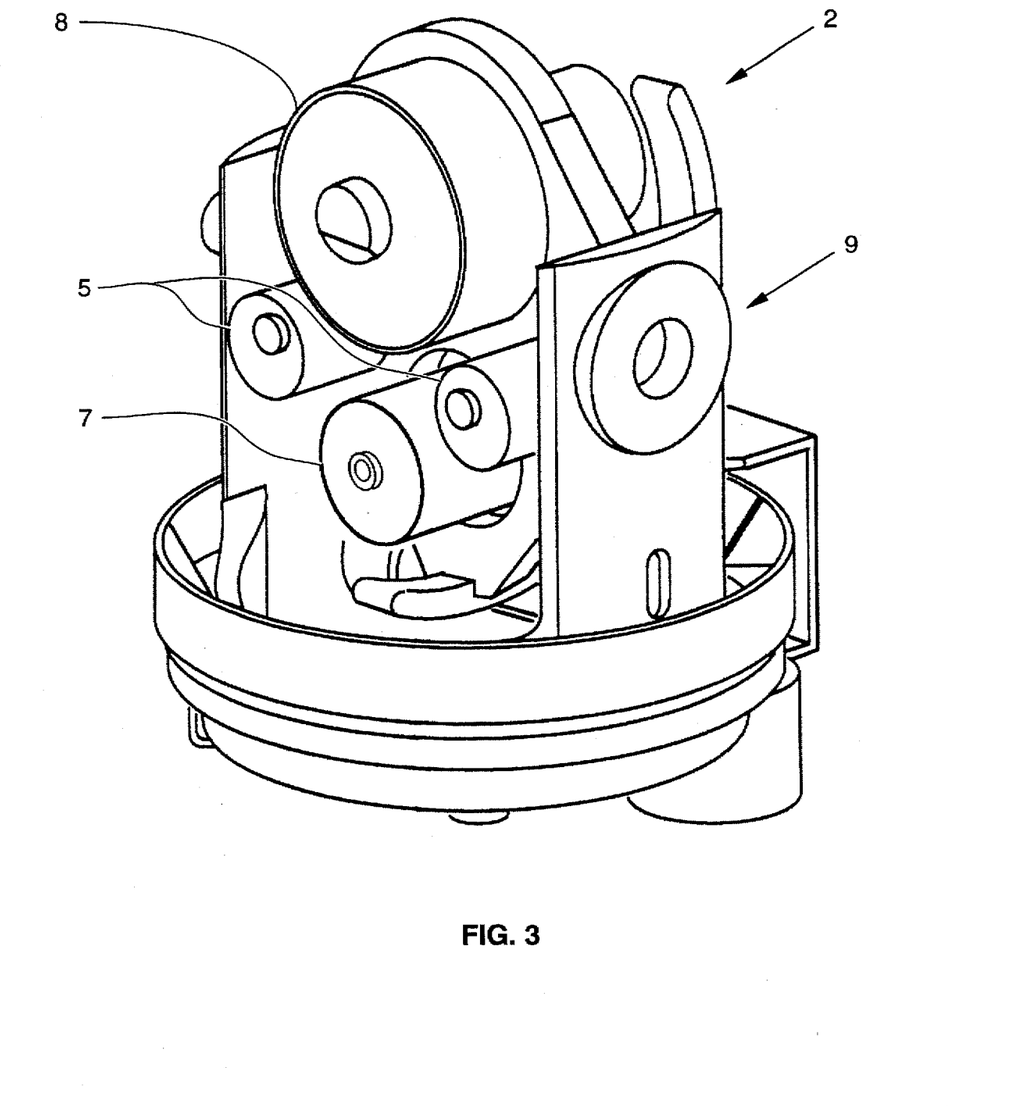
FIG. 3 is a prospective drawing of a transceiver according to the present invention.
Figure 4:
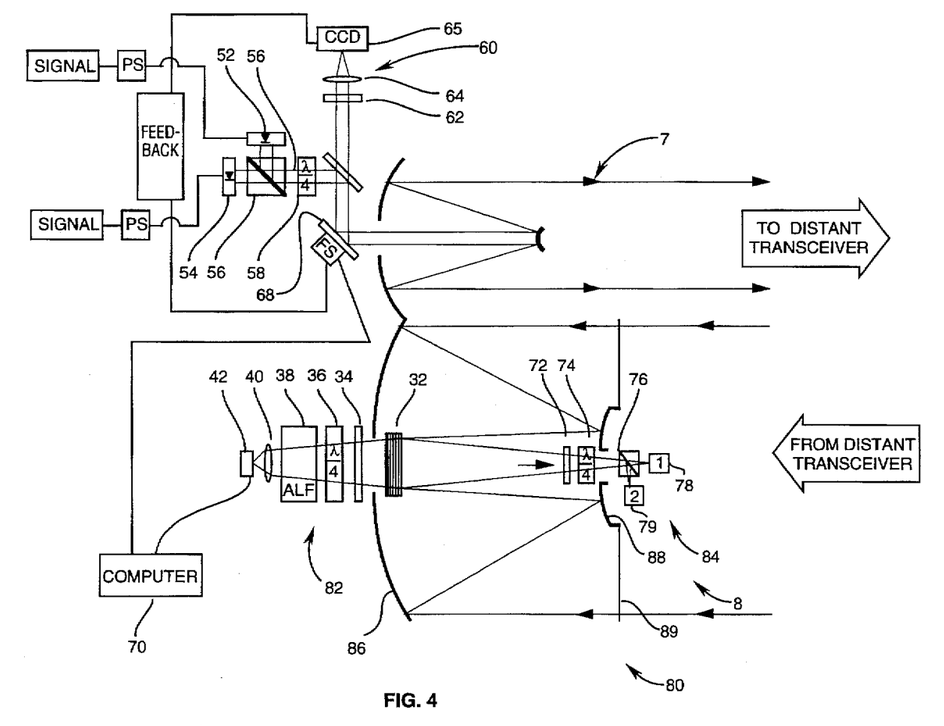
FIG. 4 is a schematic drawing of the transceiver shown in FIG. 3.

The transceiver of this preferred embodiment is shown in a prospective view in FIG. 3 and in schematic view in FIG. 4. The principal elements of the transceiver are two wavelength controlled beacon lasers 5, a laser transmitter 6, a receiver 7, a two-axis pointing gimbals 9 and a control computer not shown.

BEACON LASERS

Figure 5:
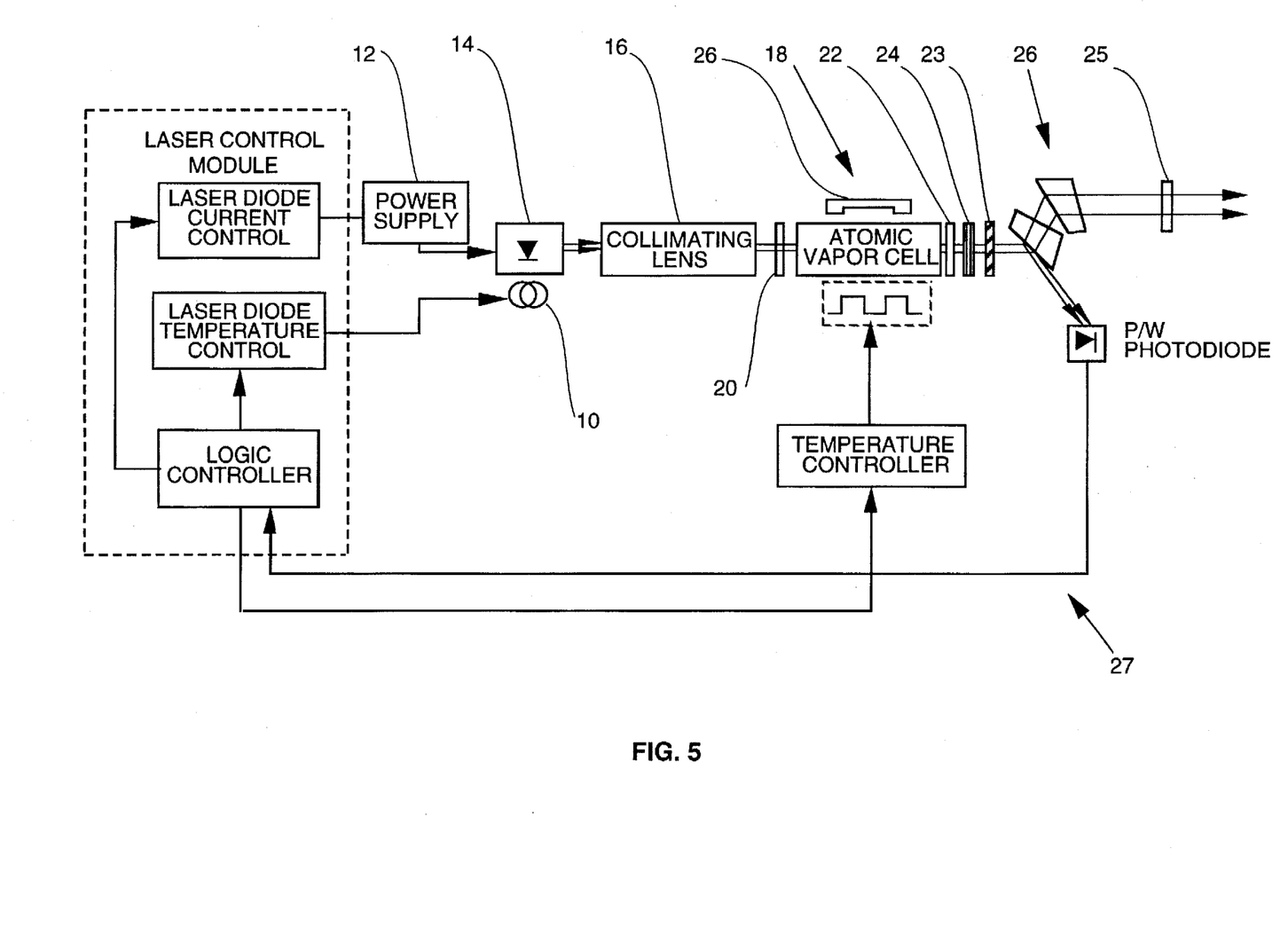
FIG. 5 is a schematic drawing of a beacon laser.
Figure 8A:
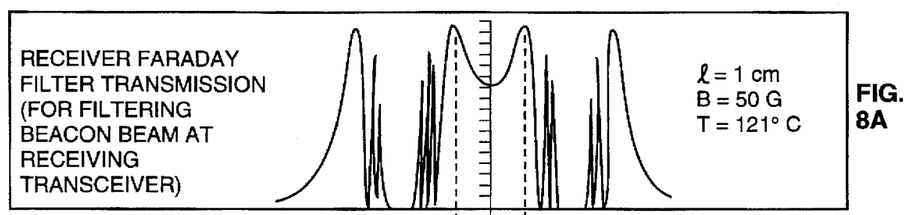
FIGS. 8A, 8B and 8C are transmission curves.
Figure 8B:
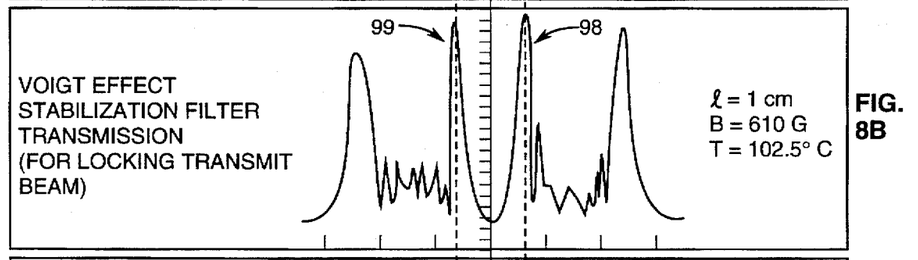

Each of the two wavelength controlled beacon lasers 5 in this preferred embodiment includes a 150 mWatt diode laser supplied by SDL. These lasers with appropriate shaping optics have a beam divergence of 2 mrad and operate nominally at 852 nm wavelength. In this preferred embodiment, we lock these lasers at one of the precise wavelengths at or very near 852.11 nm, which correspond to the 6p 1/26p3/2 transition in cesium. To do this, each of the two laser systems are configured into a wavelength controlled unit as shown in FIG. 5. This control is achieved using temperature control and current control of the laser and a Voigt filter. The control of the laser is provided by thermoelectric device 10 and electric power supply 12. The output of diode element 14 passes through lens assembly 16 and through Voigt filter 18. Voigt filter 18 is similar to a Faraday atomic line filter except the magnetic field is at right angle to the beam direction. (The Voigt filter is described in more detail in a following section of this specification.) A magnetic field produced by permanent magnets 26 at right angle to the laser beam operates on an atomic vapor (in this case cesium at about 100° C.) in order to provide four extremely narrow pass bands near 852 nm as shown in FIG. 8B. Crossed polarizers 20 and 22 stop all light which does not have its polarization rotated within the filter. The polarization of light near the atomic resonance is rotated 90° within the filter. Feedback mirror 24 passes 80 percent of the light incident on it and reflects 20 percent. The 20 percent of the light is reflected back into diode laser 14 forcing it to lock at the selected wavelength. The light beam passing through feedback mirror 24 passes through additional optics to convert the beam to a circular polarization. These optics consists of a ½ wave plate 23 to rotate the polarization to match an anamorphic prism 26 pair which circularizes the beam and a ¼ wave plate 25 to circularly polarize the beam. The resulting output of each beacon is a 100 mW circularly polarized laser beam with a wavelength of 852.11 nm and a divergence of about 2 mrad. (This divergence results in a footprint with a 10 km diameter at a distance of 5,000 km.). A feedback circuit 27 is provided to control the diode temperature and maintain the output at the selected precise wavelength.

The laser diodes we use are provided by Spectra Diode, Model No. SDL 5421-G1. The temperature of the diode is regulated by two Melcor FC 0.6-65-06-1 thermoelectric heat pumps. The heat pumps are driven by a Hytek Microsystems HY-5610 thermoelectric cooler controller. The temperature of the laser diode is maintained to within ±0.05° C. of the required temperature for optimum wavelength stability. The laser diode is driven by a low noise, voltage controlled current source. The current source used to drive the laser diode is one from Industrial Laser Inc., Model LD 1250CC. The laser diode output is collimated with a Rodenstock 1403.108 lens and passes through the Voigt filter. The temperature of the cesium vapor cell is controlled by a Dawn Electronics model DN505 subminiature proportionally controlled heater epoxied to the vapor cell body. The temperature is maintained at 102.5° to achieve the proper transmission spectrum. The transverse magnetic field of 610 gauss is supplied by two magnets (Dexter Permag #ND35570048) located on either side of the vapor cell. The field is oriented 45° to the polarization of laser light and 90° to the beam direction. Corning 900-HC crossed polarizers stop all light which does not have its polarization rotated 90° within the filter. A CVI PRI-850-20-0537 partially reflective mirror is used to pass 80% of the light incident on it and reflect 20%. A CVI QWPO-850.0-05-2 half wave plate is used to rotate the polarization by 90° so that the polarization is perpendicular to the long axis of the laser light. This is necessary because a Melles Griot 06-GPA-004 anamorphic prism pair is used to circularize the elliptical laser light. The input of the anamorphic prism pair is Brewsters angle and there would be a 50% loss in light if the polarization were not corrected. A small portion of the laser light is reflected off the input surface of the anamorphic prism pair. An Advanced Photonix SD-1004121231 amplified photodiode is used to detect this reflected light. The signal is used for closed loop control of the laser transmitter output and wavelength.

SIGNAL TRANSMITTER

Diode Lasers

The laser source of transmitter 8 are two 100 mW diode lasers (Model No. SDL 5400 GI, supplied by SDL) designated as 52 and 54 in FIG. 4. These lasers produce 810 nm signal laser beams. The beams are directed at a polarized beam splitter 56 which reflects vertical components of the light and passes the horizontal component of the light. Thus, the vertical component of the light from transmitter laser 52 and the horizontal component of light from transmitter laser 54 passes into beam splitter 56. Quarter wave plate 58 changes the vertically and horizontally polarized light from the two lasers into right and left circularly polarized light which is transmitted to a distant transceiver. The beam divergence is between 15 and 100 micro radians producing foot prints at 5,000 km of less than 500 m.

Imposing Information on Laser Beam

Figure 6:
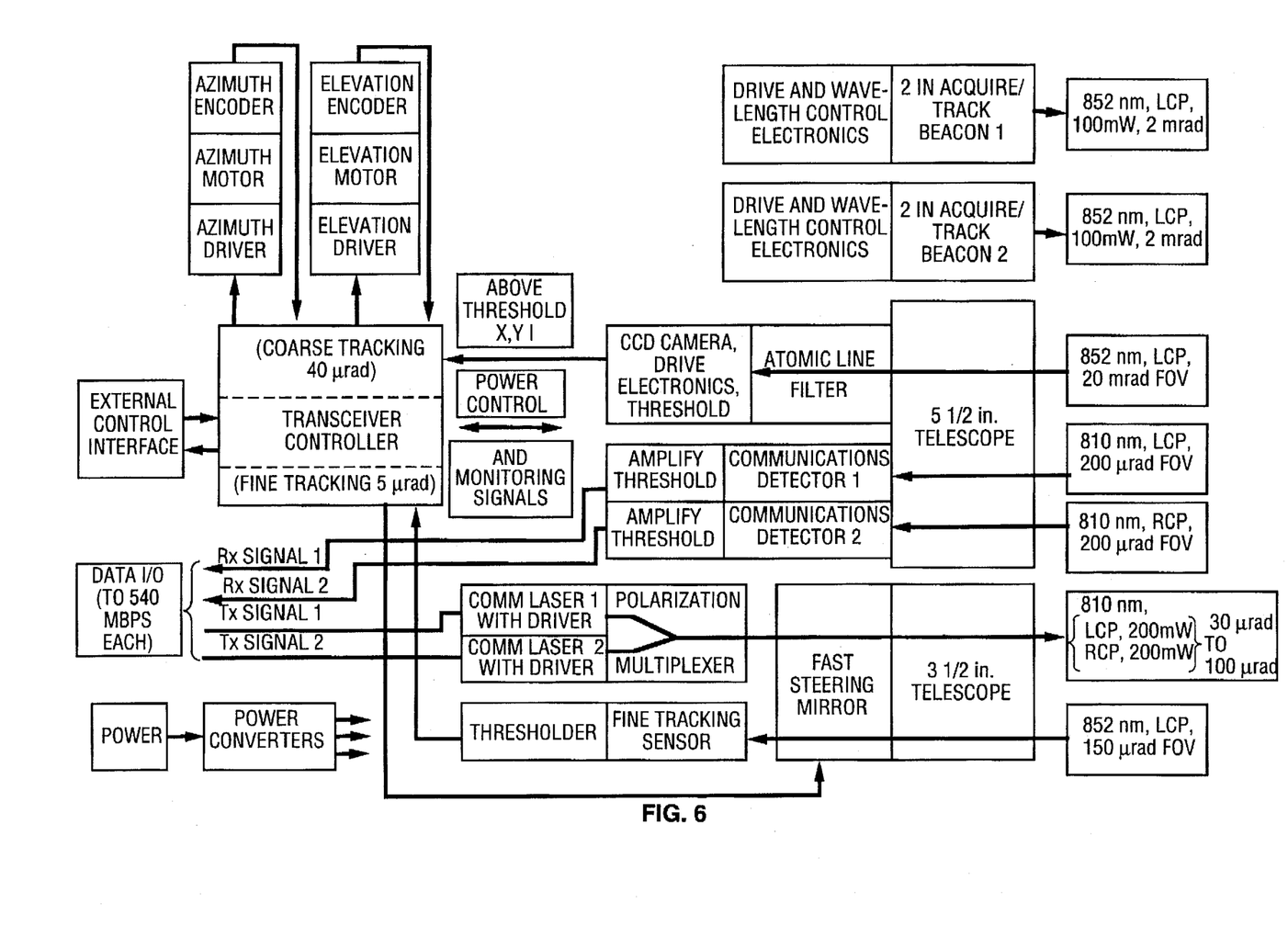
FIG. 6 is a block diagram showing some of the specifications of a preferred embodiment of the present invention.

As shown in FIG. 6 the outputs of signal lasers 52 and 54 are directly modulated at rates up to 540 million modulations (representing 1's or 0's) per second by imposing digital electronic signals on the input power supply to the lasers. The technique used is the same technique widely used in fiber-optic communication. (This is referred to as non return to zero, on/off keying.)

Feedback Pointing of Signal Beam

Small field of view (150 micro radian) APD array receiver 60 consists of an interference filter 62 which passes 852 nm light from a beacon laser on the transceiver to which the signal beam is being transmitted. This beam is focused by lens 64 on to 20×20 CCD array 65 arranged in a feed back circuit with fast steering mirror 68 and computer 70 to maintain the axis of the transmitter beam pointed directly (within an accuracy of about 5 to 40 micro radians) at the transceiver from which the incoming beacon light originates.

RECEIVER

The principal elements of the receiver 7 is shown in schematic form in FIG. 4. There are three primary elements of the receiver, a Schmidt-Cassegrain telescope 80, a beacon receiver unit 82, and a signal receiver unit 84. The telescope 80 serves both receiver units.

Receiver Telescope

The receiver receives beacon light from the wavelength controlled laser beacons of another transceiver at 852 nm through wide a field of view Schmidt-Cassegrain telescope 80 with primary mirror 86, secondary mirror 88 and corrector plate 89. The telescope has a 5.5 inch clear aperture and a 2.5 inch obscuration. The beacon light is directed to dichroic mirror 32 which passes light at 852 nm and reflects light at 810 nm.

Beacon Receiver Unit

The beacon light passing through dichroic mirror 32 passes through interference filter 34, through ¼ wave plate 36, then through Faraday atomic line filter 38 which consists of a cesium vapor cell located in a magnetic field and crossed polarizers to permit the passage of light only near the wavelength of 852.11 nm. The beacon light is then focused to a spot through lens 40 on to a 256×256 array of a 200 Hz frame readout rate CCD acquisition camera 42. The entire receiver has a field of view of 20 milliradians. This 20 milliradian field is equivalent to about 100 km diameter field at 5000 km.

Electronics connected to the CCD camera 42 processes the beacon signal and determines to centroid value of the spot on the CCD camera. Using this information computer 70 determines where the azimuth and elevation axes of the transceiver should be positioned to point the axis of telescope 80 directly at the beacon laser of the distant transceiver to within an accuracy of ±20 micro radians. Computer 70 controls azimuth and elevation motors 46 which drive gimbal axes to the correct positions. These positions are measured by on axis shaft encoders (also not shown).

Signal Receiver Unit

As discussed above, information is transmitted by the transmitter unit of the distant transmitting transceiver at 810 nm as right and left circularly polarized light. This 810 nm light is reflected from dichroic mirror 32 as shown in FIG. 4. The reflected beam passes through interference filter 72. Quarter wave plate 74 converts the right and left circularly polarized light into vertically and horizontally polarized light. Polarized beam splitter 76 splits the light into two beams, a vertically polarized beam directed into avalanche photo diode detector (APD) receiver 78 and a horizontally polarized beam directed into APD receiver 79. The field of view of each of receiver 78 and 79 in this arrangement is about 200 micro radians. (This very narrow field of view corresponds to a 1 km diameter field at 5000 km.) Thus, APD receiver 78 will receive information transmitted by a transmitter laser 52 of the distant transceiver, and APD receiver 79 will receive information transmitted by a transmitter laser 54 of the same transceiver. These APD receivers can receive digital data at rates of about 560 million bits per second (MBPS) or a total for both channels of 1.13 GBPS. This compares very favorably with 4 kHz bandwidth telephone line which transmit at about 64,000 BPS and 4.2 MHz bandwidth television transmitter which transmits about 86 MBPS and satellite television at about 20 MBPS.

POINTING GIMBALS

Figure 7:
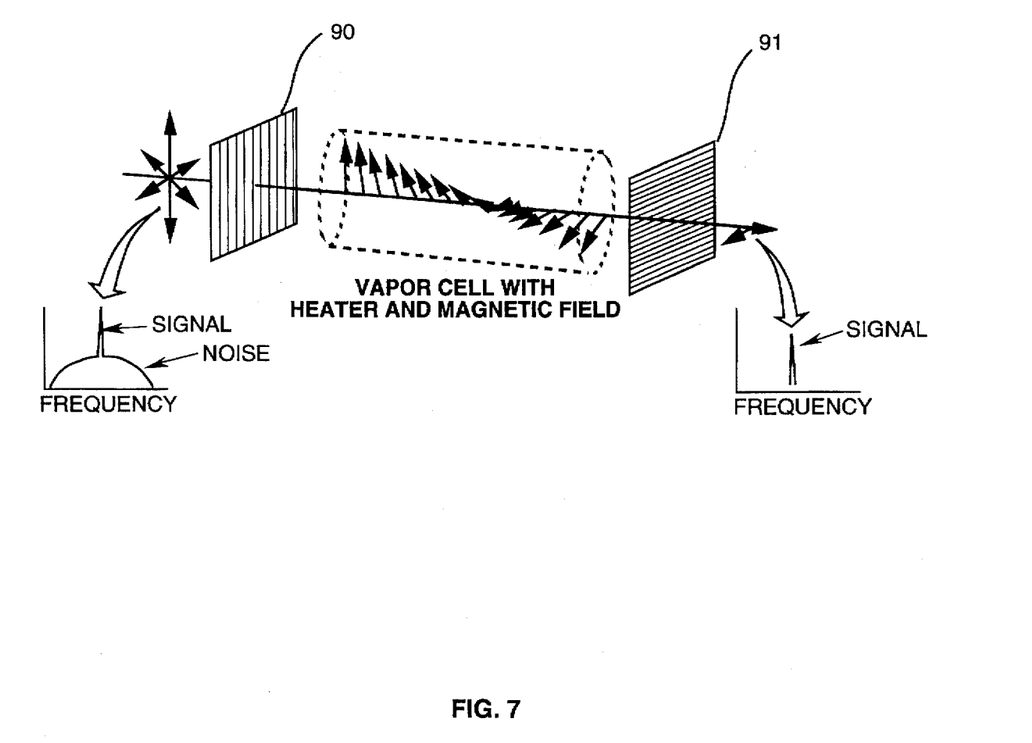
FIG. 7 is a drawing showing the features of a Faraday filter.

The two-axis pointing gimbal 9 is very important since it must line up the receive telescope to within an accuracy of 20 micro radians as indicated above. Gimbal movement in this preferred embodiment is controlled using a ROTO-Lok drive, patented by and available from Sagebrush Technologies of Albuquerque, N. Mex. This drive mechanism is capable of extremely free pointing, with virtually no backlash. The drive mechanism, shown in FIG. 7, is an offset drive where a motor shaft (capstan) is coupled to a drum holding the transceiver optics using multiple thin cables. Friction is sufficient to keep the cables from slipping (other than long term creep which can be re calibrated) and the free span of cable which can stretch is very short, so that there is negligible phase delay between the drive motor and the drum for operational frequencies and inertias. In addition to its smooth and accurate drive characteristics which are important for high closed loop tracking bandwidth, the Roto-Lok drive can be made reactionless, imparting no angular momentum to a host satellite. This is possible because the capstan moves in the opposite sense from the drum, but at a speed which is higher by a factor of the turn down ratio, say 20. If the inertia of the motor plus the capstan is made to be this same factor lower than that of the dram, the drive is reactionless. The present inventors have demonstrated this feature in the laboratory, and are currently incorporating it in units to be used for field tests.

BLOCK DIAGRAM

FIG. 6 is a block diagram showing the elements of the transceiver of this preferred embodiment. This diagram summarizes the power levels, divergence parameters, wavelengths of the lasers and the wavelengths and fields of view of the detector units.

SIGNAL TO NOISE

Philosophy Behind Signal to Noise Requirements

One of the issues associated with laser communications is potential interference from background solar radiation scattering off optical elements, or reflected from the earth or clouds. For a high data rate communications channel, an interference filter with a bandwidth of 10 nm can be used to bring background light noise down to the level of detector noise if the detector field of view is very small. On the other hand, acquisition of a laser beacon to initiate a Lasercom link requires much better background light rejection to accomplish the acquisition rapidly. The reason is that a satellite or aircraft has limited accuracy knowledge of what direction in space it is pointing at a given time, so that to ensure fast acquisition a receiver field of view of 1° or more is desirable. If the earth is in the field of view of the receiver, such as for a satellite to aircraft or ground link, the background light intensity will be significant. Furthermore, since generally the same receiver element will be used for acquisition and coarse tracking, spatial as well as temporal fluctuations in the background light are important, meaning that the background noise level is equal to the maximum background light intensity, rather than its square root. Because we would also like the acquisition beacon (which the Lasercom transceiver locks on to initiate a link) to have as wide a divergence as possible to minimize scanning times we have chosen an optical filter in the receiver for which the background noise is about equal to the detector noise for the desired wide field of view of about 1.25°. A Dalsa CCD camera having 256 by 256 pixels and a readout rate of 200 Hz has been chosen for our transceivers because it has a high enough resolution and readout rate to meet our tracking accuracy and bandwidth requirements. After digitization, the noise equivalent power of the camera is $9 \times 10^{-14}$ Watts/pixel.

The background light is assumed to be 0.2 W/m2.nm.sr, with a telescope aperture of 0.012 m$^2$ and a telescope and filter throughput of 0.125 for background light. (Transmission is 0.25 for the polarized beacon signal). A filter bandwidth of 0.02 nm is required for an acquisition field of view of 20 mrad. This filter bandwidth cannot be achieved with an interference filter, and thus we have incorporated an extremely narrow band atomic line filter in our system. An additional advantage of using such a narrow band filter is that telescope baffling requirements against solar scatter are greatly reduced, and a much shorter, more compact low f/number telescope design can be used.

The System Design

Figure 9A:
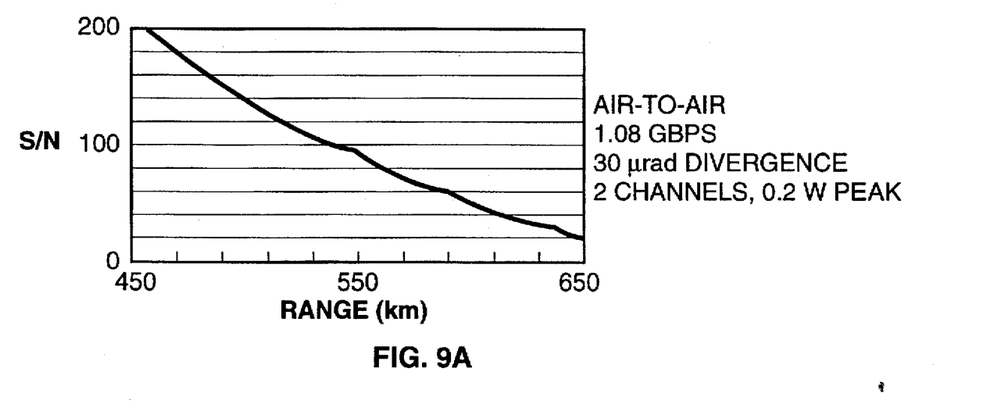
FIG. 9 is a block diagram showing approximate information signal/noise levels which are achieved with a preferred embodiment of the present invention.
Figure 9B:
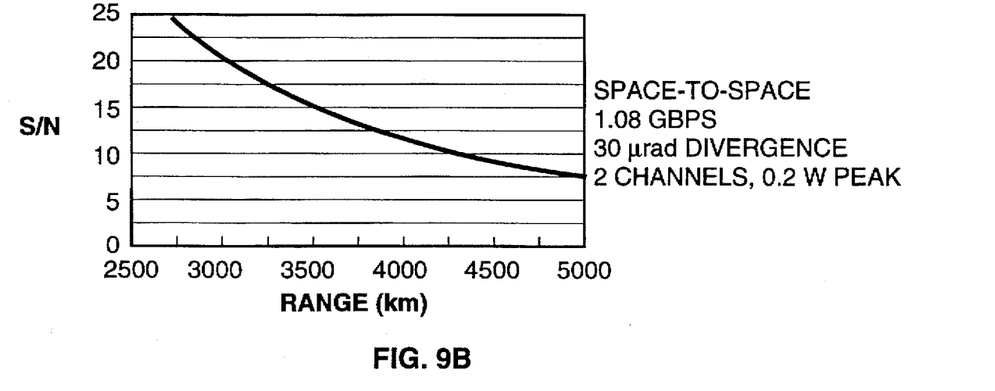
Figure 9C:
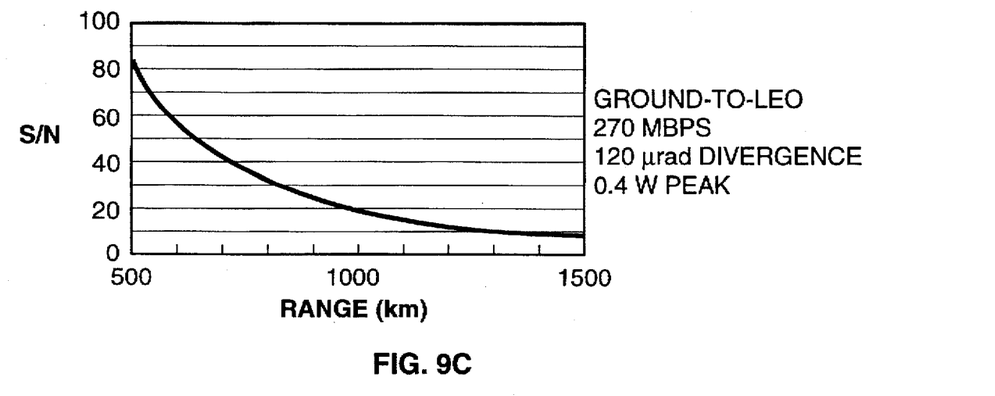

Predicted signal-to-noise calculations are plotted for various communications scenarios in FIGS. 9A, 9B, and 9C. The calculations assume an avalanche photo diode and amplifier system with an illumination noise equivalent power of 0.16 pW/Hz½ operated at a bandwidth of 400 MHz. The calculations include atmospheric absorption and scattering, with the ground terminal assumed to be at 8,000 ft., the aircraft transceivers are assumed to be at 40,000 ft., and the satellite assumed to be at and altitude of 425 km. (The FIG. 9A results did not include atmosphere scintillation.) The ranges given are the horizontal range. The receive aperture is assumed to be 0.012m$^2$, the receiver efficiency is 0.6, the transmit laser power is 400 mW peak with 0.6 transmit efficiency, and the data rates and divergences are as shown. Effects of atmospheric scintillation are estimated to degrade the signal by a factor of 10. A signal to noise ratio of 6 should be adequate for a 10$^{-6}$ bit error rate in the space link. Thus, with these assumptions the full capability terminal should achieve data rates of 1.13 GBPS over a space range of 5,000 km, and over and air range of 550 km with aircraft at 40,000 ft. Scaling to longer ranges can be achieved with minimum change in design by incorporating lower noise detector amplifiers and higher power laser transmitters.

Faraday and Voigt Filters

Operational principles of our Faraday filter can be understood by reference to FIG. 7. Crossed polarizers 90 and 91 serve to block out background light with a rejection ratio better than 10$^{-5}$. We use high transmission polarizers which have a transmission of higher than 95%. Because these polarizers only work over a limited wavelength region in the infrared, a broad band interference filter is used in conjunction with the Faraday filter. Between the polarizers an atomic vapor (in this case cesium having a strong resonance near the wavelength of the beacon beam) in a magnetic field axially aligned with the path of the beam rotates the polarization of the beacon laser signal by 90°, while leaving other wavelengths unrotated, and thus blocked by the polarizers. The path of the transmitted light is unaffected, so spatial information is maintained.

Figure 8C:
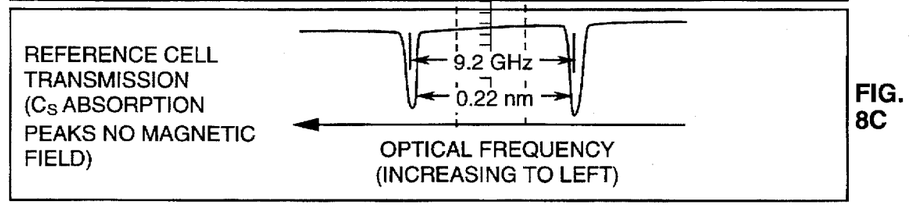

Polarization rotation is due to the separation in optical absorption frequencies for right and left circularly polarized light in the magnetic field due to the Zeeman effect. The index of refraction of the vapor near an absorption is different from 1, and the absorption separation causes the index to be different for right and left circular polarization at a given frequency, and thus those polarizations travel through the vapor with a different phase velocity. The effect of this is to cause a frequency dependent rotation in the polarization of the incoming linearly polarized light which only occurs near the atomic absorption peak. Transmission through the filter is maximum where the polarization rotation is 90°, 270°, etc., provided that the frequency of the beam is far enough away from the atomic resonance not to be absorbed. The Voigt filter is similar to the Faraday filter. In the Voigt filter, magnetic field is arranged so that the field lines are perpendicular to the beam direction. The vapor acts like a half wave plate rather than a Faraday rotation to achieve 90° polarization rotation. Transmission spectra in the range of 852 nm for cesium for the Faraday filter is shown in FIG. 8A and that for the Voigt filter is shown in FIG. 8B. (This spectrum is saturated with the laser power used in the locked beacon.) Note that the transmission peaks are much sharper in the Voigt filter as compared to the Faraday filter. We use this to our advantage when we pick the Voigt filter to lock our beacon transmitter laser and when we pick the Faraday filter for use in our receiver unit. This allows us to accommodate for Doppler shifts due to relative velocities of the satellites. In our preferred embodiment we can operate one of our beacon lasers at the lower frequency designated as 98 in FIG. 8B and the other one at the higher frequency 99. This allows us to accommodate both approaching and receding satellites. If we know the receiving satellite is approaching we can set both beacons at the lower peak 98. The transmission spectrum for cesium vapor absent a magnetic field is shown in FIG. 8C. The path length through the cesium vapor is 1 cm in both cases. The Faraday filter is operated at a temperature of 121° C. and in a magnetic field of 50 gauss as shown on the figure. The Voigt filter is operated at 95° C. and 600 G.

RELAYING INFORMATION

FIG. 1 is a diagram which shows how information is relayed around the earth from satellite to satellite. Basically the electronic output of a receiving transceiver on a satellite is the input of a second transceiver on the satellite which relays the information to a transceiver on a second satellite. Codes contained in the transmitted information are read by a computer on each satellite which properly directs the information to the proper transceiver. Any of several multiplexing-switching schemes currently widely used in fiber-optic communication can be used in these relay situations. Two of such schemes are known as asynchronous transfer mode (ATM) and synchronous transfer mode (STM).

POWER AND WEIGHT

Transceiver 2 shown in FIG. 3 is fabricated in a tough light carbon fiber epoxy composite structure. The design weight of the full system (including control electronics when miniaturized)is under 50 pounds with an operating power requirement of under 75 Watts. The Roto-Lok drive used has an azimuth field of regard of 270° and an elevation field of regard from −30° to +100°. The gimbal is designed to mount in a Texas Instrument FLIR enclosure for hanging below an aircraft fuselage, to provide greater than hemispherical field of regard.

While the above description contains many specifics, the reader should not construe these as limitations on the scope of the invention, but merely as exemplifications of preferred embodiments thereof. Those skilled in the art will envision many other possible variations are within its scope. For example, persons skilled in the art will be able to make changes appropriate for communicating over shorter or longer distances than those referred to in the examples. A smaller network of 11 low earth orbit satellites could provide one band around the earth which would provide communication to and from a large portion of the earth. Full communication networks with less satellites than 66 (for instance 48) are also feasible. Both the beacon lasers and the signal laser beams are not eye safe close to the transmitting unit. This is probably not a problem for transceivers in orbit but could be for other applications. The beacon laser could be made eye safe by expanding the beam to 20 cm diameter before being transmitted. The signal laser could also be made eye safe by expanding it. An alternate approach would be to provide a shutter which is open only when beacon light is being received for the distant transmission. Accordingly the reader is requested to determine the scope of the invention by the appended claims and their legal equivalents, and not by the examples which have been given.

We claim:

1. A laser communication transceiver for transmitting information via laser beams to other laser communication transceivers and for receiving information via laser beams from other similar laser communication transceivers comprising:

A) at least one wavelength controlled beacon laser means for producing at least one beacon laser beam at a predetermined narrowband wavelength defining a narrow band beacon wavelength, B) a laser transmitter system comprising:
1) at least one laser means for producing a signal laser beam,
2) a signal modulation means for modulating said signal laser beam to impose a communication signal on said laser beam, C) a laser receiver means for receiving laser beams transmitted from said other laser communication transceiver comprising:
1) a telescope means for collecting laser beams transmitted from said other laser communication transceiver,
2) a beacon receive means, comprising an atomic line filter matched to said narrow band beacon wavelength, for detecting and determining the direction of beacon laser beams transmitted by said other similar laser communication transceivers,
3) a laser signal receive means for receiving signal laser beams transmitted by said other similar laser communication transceiver, D) a gimbal pointing means for pointing said telescope means toward said other laser communication transceiver in the direction determined by said beacon laser means.

2. A transceiver as in claim 1 wherein said at least one beacon laser means are two laser systems each system comprising an atomic line filter for wavelength control.

3. A transceiver as in claim 2 wherein said atomic line filter is a Voigt filter.

4. A transceiver as in claim 3 wherein said Voigt filter comprises a cesium vapor cell.

5. A transceiver as in claim 1 wherein said laser receiver means comprises a dichroic mirror for separating beacon laser beams from signal laser beams.

6. A transceiver as in claim 1 wherein the signal receiver means has a narrow field of view of about 200 microradians.

7. A transceiver as in claim 1 wherein the signal receive means has a narrow field of view of less than 200 microradians.

8. A global laser communication system comprising a plurality of transceivers on each of at least eleven satellites in orbit around the earth, each transceiver comprising:

A) at least one wavelength controlled beacon laser means for producing at least one beacon laser beam at a predetermined narrowband wavelength defining a narrow band beacon wavelength, B) a laser transmitter system comprising:
1) at least one laser means for producing a signal laser beam,
2) a signal modulation means for modulating said signal laser beam to impose a communication signal on said laser beam, C) a laser receiver means for receiving laser beams transmitted from said other laser communication transceiver comprising:
1) a telescope means for collecting laser beams transmitted from said other laser communication transceiver,
2) a beacon receive means, comprising an atomic line filter matched to said narrow band beacon wavelength, for detecting and determining the direction of beacon laser beams transmitted by said other similar laser communication transceivers,
3) a laser signal receive means for receiving signal laser beams transmitted by said other similar laser communication transceiver, D) a gimbal pointing means for pointing said telescope means toward said other laser communication transceiver in the direction determined by said beacon laser means.

9. A communication system as in claim 8 wherein said at least eleven satellites is at least 48 satellites.

* * * * *